United States Patent [19]

Loker et al.

[11] 4,350,041
[45] Sep. 21, 1982

[54] SYSTEM AND METHOD FOR MEASUREMENT OF DYNAMIC ANGULAR OR LINEAR DISPLACEMENT

[75] Inventors: Aleck Loker, Leonardtown; Richard Archibald, Hollywood, both of Md.

[73] Assignee: The United States of America as represented by the Secretary of the Navy, Washington, D.C.

[21] Appl. No.: 195,444

[22] Filed: Oct. 9, 1980

[51] Int. Cl.³ .................................... G01M 13/02
[52] U.S. Cl. ........................... 73/432 R; 73/862.34
[58] Field of Search ............... 73/432 R, 862.34, 162; 33/1 N

[56] References Cited
U.S. PATENT DOCUMENTS 3,589,178 6/1971 Germann .................. 73/862.34
3,604,255 9/1971 Bart ........................ 73/862.34

Primary Examiner—S. Clement Swisher

[57] ABSTRACT

A system and method for measuring linear displacements, especially wear in the coupling of two rotating shafts. A magnetic pickup is located near each shaft and a magnetic pole located at a fixed position on each shaft induces a magnetic pulse in its associated pickup when the pole passes under the pickup. The pulses are fed to an AND gate and produce an output pulse when they overlap. As wear progresses, the magnetic pulses overlap either more or less, depending on the direction of rotation of the shafts and, correspondingly, the AND-gate output pulse duration increases or decreases. The change in AND-gate pulse duration is a measure of coupling wear and can be recorded or displayed in engineering measurement units.

9 Claims, 9 Drawing Figures

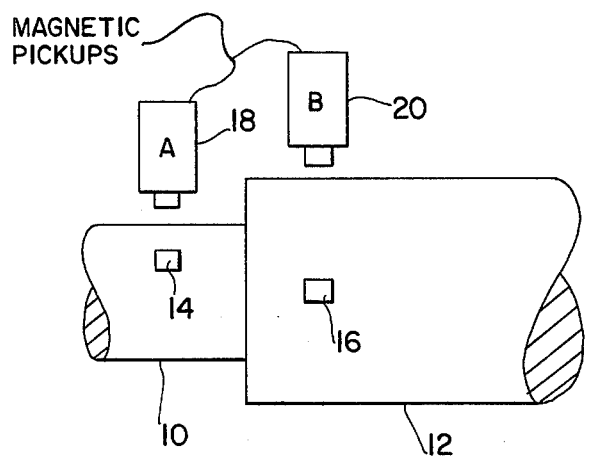
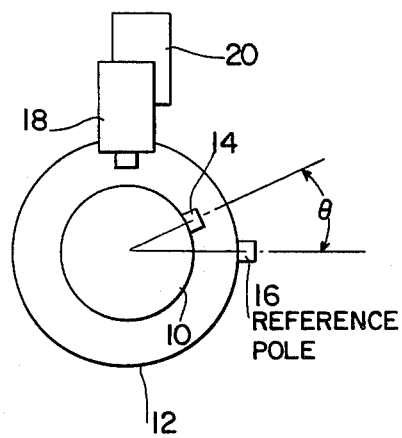
FIG. 1A
PRIOR ART
FIG. 1B
PRIOR ART
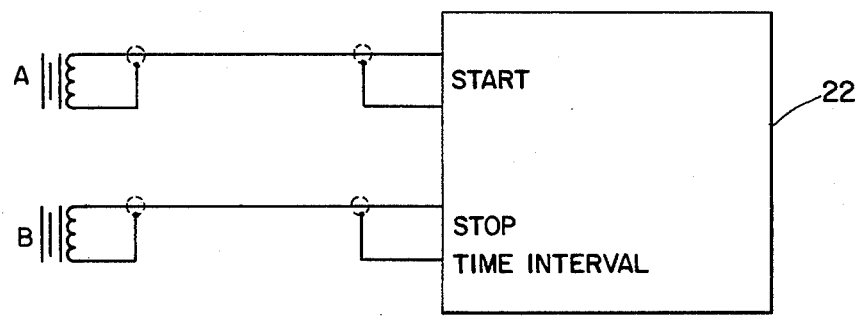
FIG. 1C
PRIOR ART
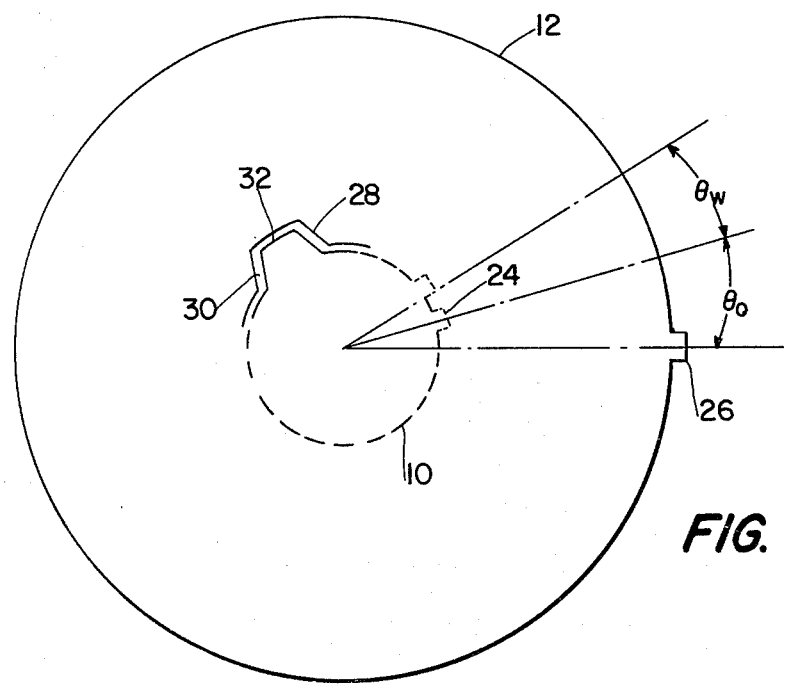
FIG. 2

SYSTEM AND METHOD FOR MEASUREMENT OF DYNAMIC ANGULAR OR LINEAR DISPLACEMENT

BACKGROUND OF THE INVENTION

This invention relates to measurement of angular or linear displacements and especially to measuring the angular displacement caused by spline wear of two shafts coupled by a spline in a slot.

Many rotating machines consist of a driver unit and a driven machine, the shafts of the two being coupled fixedly to each other by means of a spline on one shaft which fits into a slot in the other shaft. The slot and spline wear away with continued use and it is desirable to have a means for measuring such wear while the machines are in use.

A previous method of wear measurement employed the generation of timing pulses by magnetic pickups (monopole generators) and the use of a standard digital time-interval meter to measure the change in the time interval between the pulses as coupling wear progressed. This method, which is illustrated in FIG. 1, proved to be unsatisfactory when applied to spline wear test due to torsional oscillation and other mechanical disturbances (of amplitudes greater than the signal to be measured) which disrupted the time interval meter operation. Torsional oscillations, for example, induced a rapid change in the time interval which caused random variations in the time interval meter. Averaging techniques had to be applied to the meter readings to establish the true time-interval change and this averaged value was then used to manually calculate coupling wear from an equation.

The average values proved to be more accurate than the raw data, but were not of sufficient accuracy for some types of research data application. Standard time interval measurement equipment has also proved to be subject to errors induced in triggering from the unbuffered magnetic pickup signals, since signal amplitudes also vary significantly due to torsional and linear oscillations inherent in most rotating machinery.

Accordingly, it would be very desirable to develop a method of measuring the oscillating time interval between pulses of varying amplitudes and of averaging or cancelling out the periodic oscillations due to torsional or linear vibration, since no suitable instrumentation now exists. The developed instrumentation method has to be compatible with standard digital and analog recording and display devices. In summary, the disadvantages of existing methods of measuring angular or linear displacements are:

a. Static measurements require stopping the machinery, thereby suspending any tests in progress.

b. A Time Interval Meter approach permits dynamic measurements to be made but is unstable and inaccurate when torsional or linear oscillations disturb the timing signals.

c. A Time Interval Meter approach does not readily permit automatic recording and display of coupling displacement in direct engineering units.

d. A Time Interval Meter approach does not readily permit automatic monitoring and shutdown of machinery upon attaining a preset angular or linear displacement threshold.

e. Existing methods provide no direct display or recording of displacements in engineering units.

SUMMARY OF THE INVENTION

An object of the invention is to accurately measure angular and linear displacements by means of timing signals even when torsional or linear oscillations perturb the timing signals.

Another object is to provide direct display or recording, in engineering units, of angular or linear displacements.

A further object is to enable automatic monitoring of machinery to determine the occurrence of a preset amount of coupling displacement.

Still another object is to measure angular or linear displacements under dynamic conditions.

The objects and advantages of the present invention are achieved by obtaining an electrical pulse from each of two coupled shafts as each passes a reference location. The pulses are fed to an AND-gate to produce an output pulse whose time duration measures the period of overlap of the input pulses. The time duration of the AND-gate pulse is proportional to the angular displacement of the shafts and any change in the time duration of the AND-gate pulse is in direct proportion to a change in the angular displacement of the shafts, the latter being caused by wear in the shaft coupling means.

Processing means are employed to process the AND-gate pulse so that it can be recorded and/or displayed in terms of engineering units, e.g., in inches, or in degrees, as desired.

BRIEF DESCRIPTION OF THE DRAWINGS

FIG. 1a is a schematic illustration of a pair of coupled shafts and magnetic means associated therewith.

FIG. 1b is a side view of FIG. 1a.

FIG. 1c is a schematic diagram of the circuit associated with the means shown in FIG. 1a.

FIG. 2 is a schematic illustration of the situation that obtains with spline and slot wear.

DETAILED DESCRIPTION OF THE INVENTION

Figure 3:
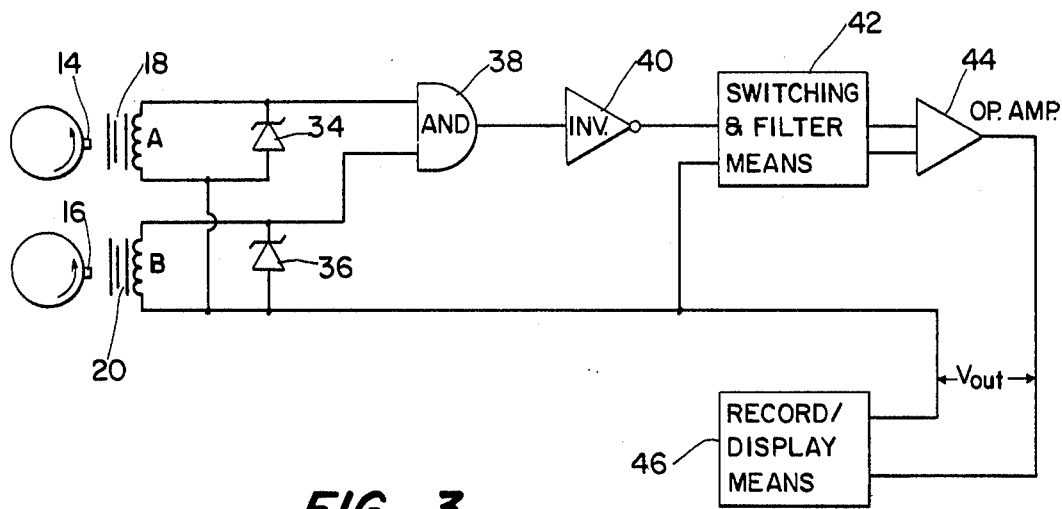
FIG. 3 is a block diagram of the circuit employed in the invention.

A prior-art device for measuring angular displacement between two coupled shafts 10 and 12 is shown in FIG. 1a. The shafts bear small ferromagnetic pins 14 and 16, one of which, e.g., 16, can be considered to be a reference pole. Magnetic pickups, or transducers, 18 and 20 are positioned close to the peripheries of the shafts 10 and 12. Initially, an angle $\theta$ (see FIG. 1b) can exist between the two ferromagnetic pins 14 and 16, the angle increasing in size as wear in the coupling occurs. The electronic circuit is shown in FIG. 1c. A magnetic pulse picked up by transducer A is fed to an Interval Timer, or Time Interval Meter 22, to initiate its action. A second pulse, generated when permanent magnet 14 passes under transducer 18, is fed to the stop input. The time between the pulses is proportional to the angle $\theta$ and the angular speed of rotation of the shafts. The expression for coupling wear in this case was found to be:

$$\text{Wear} = \frac{(\theta_i - \theta_o)\pi P}{360}$$

where
$\theta_i$=instantaneous angle determined from start to stop of timing interval
$\theta_o$=initial angle before wear started
P=coupling diameter FIG. 2 shows in schematic fashion the situation that occurs with coupling (spline) wear. Initially, there is an angle $\theta_o$ between the inner and outer shafts 10 and 12, as evidenced by the time interval between the pulse outputs 24 and 26, respectively, of the inner shaft transducer 18 and the outer shaft transducer 20. As wear between the spline 32 in one shaft and the slot 28 in the other proceeds, a gap 30 develops and this results in an addition ($\theta_w$) to the original angle ($\theta_o$).

The amount of wear, W, is derived as follows:

Let P = pitch diameter of the spline coupling
W = wear
N = shaft speed (RPM)
$t_w$ = time (secs) to move through angle $\theta_w$ $$= \theta_w / \text{angular velocity} = \frac{\theta_w}{\left(\frac{360N}{60}\right)}$$

$$= \frac{60}{360N}(\theta_w)$$

$$W = \pi P \theta_w / 360 = \frac{\pi P \left(\frac{360N\, t_w}{60}\right)}{360}$$

$t_r$ = time per revolution (secs.) = $\frac{60}{N}$ $$\therefore W = \frac{\pi P \left(\frac{360\, t_w}{t_r}\right)}{360}$$

$$W = \pi P \left(\frac{t_w}{t_r}\right)$$

An embodiment of a circuit used in this invention is shown in FIG. 3. The timing pulses generated by transducers A and B are converted into logic-level pulses by zener diodes 34 and 36, respectively, and each logic-level pulse is fed to a separate input of a logic AND gate 38. The output of the AND gate 38 (see FIG. 4 for the output waveforms and timing) is a pulse which is produced during the period ($t_b$) during which the transducer outputs from A and B overlap. This AND gate pulse output is inverted in an inverter 40 and use to drive a pulse-width-modulated switching and filter means 42 the output of which is coupled to an operational amplifier 44 which serves as a scaling device and as a buffer between the switching and filter means and the record/display means 46. The output signal, $V_{out}$, can be recorded, or displayed, or both, on an evidencing means, for example, on a cathode ray tube device, and presented directly in terms of units of displacement, such as degrees, inches, etc. In one embodiment of the device, a digital data logging unit, Monitor Lab Model 9300, was used to record and display the output data and to automatically shut down the machinery when a particular preset coupling wear or shaft torque limit was reached.

Figure 4:
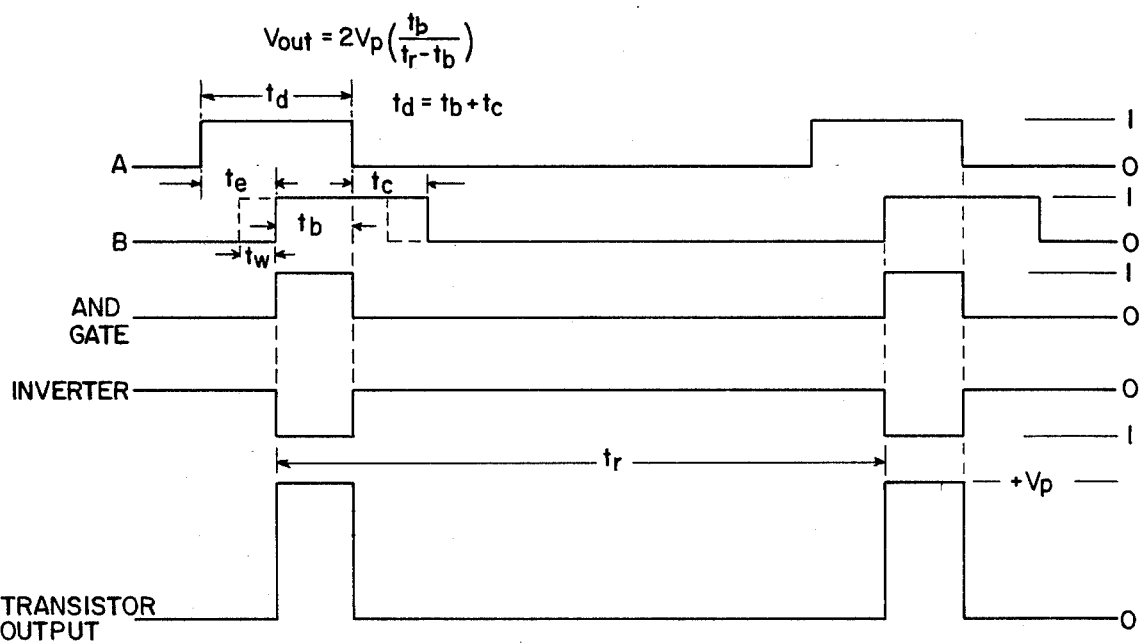
FIG. 4 is a diagram of the output digital waveforms at various points in the circuit.

The outputs of the AND gate 38 and the inverter 40 are pulses having the same pulse width, the width being proportional to the phase displacement of the signals from the magnetic transducers A and B. A change in this pulse width is proportional to a corresponding change in the displacement of the permanent magnets 14 and 16, which results from wear in the shaft coupling. FIG. 4 shows the relationships between the pulses. It can be seen that the B-transducer pulse width is $t_b + t_c$ and this sum equals the A-transducer pulse width, $t_d$. As wear increases, $t_b$ will increase or decrease proportionately, depending on whether rotation of the shafts is in one direction or the other. The increase in the time of $t_b$ is shown in FIG. 4 as the dashed portion, $t_w$, of the B pulse.

Figure 5:
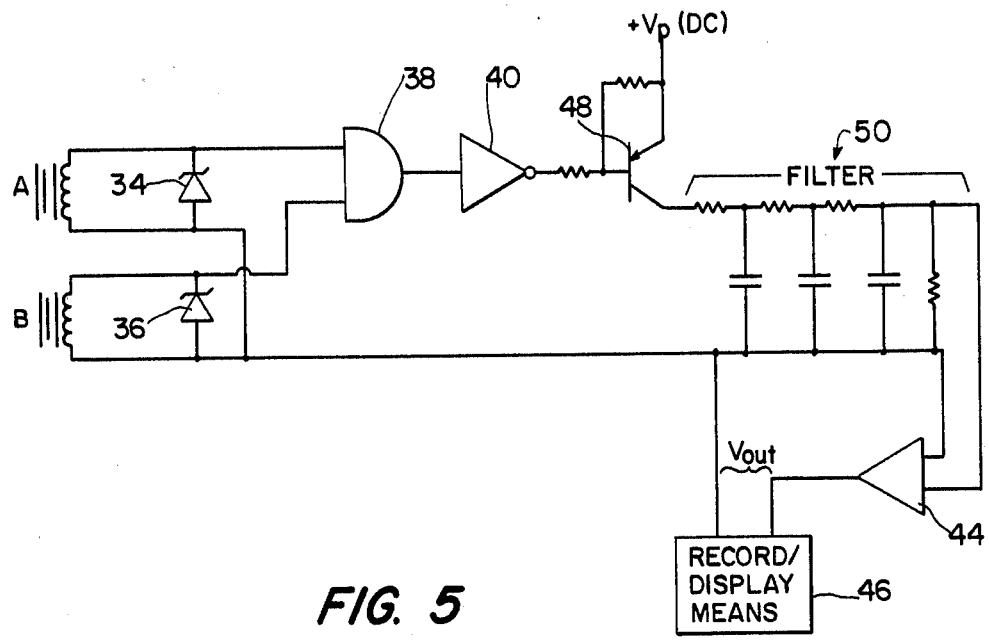
FIG. 5 is a circuit diagram of the embodiment shown in FIG. 3.

A more detailed diagram of the circuit of FIG. 3 is given in FIG. 5. The transducer pulses are conditioned, or scaled, by the zener diodes 34 and 36. The overlapped pulse output of the AND gate 38 is inverted and drives a switching means comprising a PNP transistor 48 with an emitter supply voltage of $+V_p$ volts d.c. The transistor 48 cycles on and off with the inverter-output pulses to provide pulses with a high level of $+V_p$ volts, and these are passed through a ripple filter 50 to produce a d.c. output voltage which is proportional to $t_b$, as shown below:

$$\text{Ripple filter d.c. output} = V_p \frac{t_b}{(t_r - t_b)}$$

where $t_r$ is the time between AND gate pulses. This output voltage is coupled to the operational amplifier 44 which typically doubles it so that the final output voltage of the circuit is:

$$V_{out} = 2V_p \frac{t_b}{(t_r - t_b)}$$

The adjustment or calibration procedure is defined such that $t_d > 2t_w$ or $t_b > t_w$ or $t_c > t_w$ where $t_d$ is the time duration of the output pulse from transducer A; $t_b$ is the original time duration of the AND-gate pulse; $t_w$ is the change in time duration of the AND-gate pulse due to wear in the coupling means; and $t_c = t_d - t_b$. The reason these conditions are necessary is that the pulses from transducers A and B may vary in length, e.g., the magnetic poles on the shafts may differ in length (along the circumference of the shaft).

The magnitude of a transducer pulse is determined by the proximity of a magnetic pickup transducer to its magnet and the selection of the zener diode voltage. The duration of $t_b + t_c$ is determined by the initial adjustment of the phase displacement between the magnetic transducer signals. By calibrating as described above, the duration of the pulses is selected so that the circuit can measure the total expected coupling wear regardless of the direction in which the angular displacement (or wear) progresses.

Figure 6:
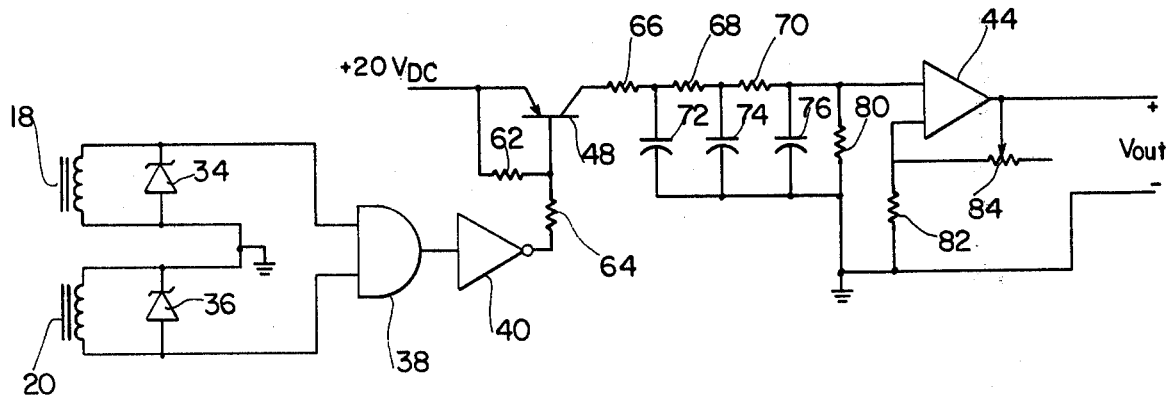
FIG. 6 is a schematic diagram of a circuit that was built and tested.
Figure 7:
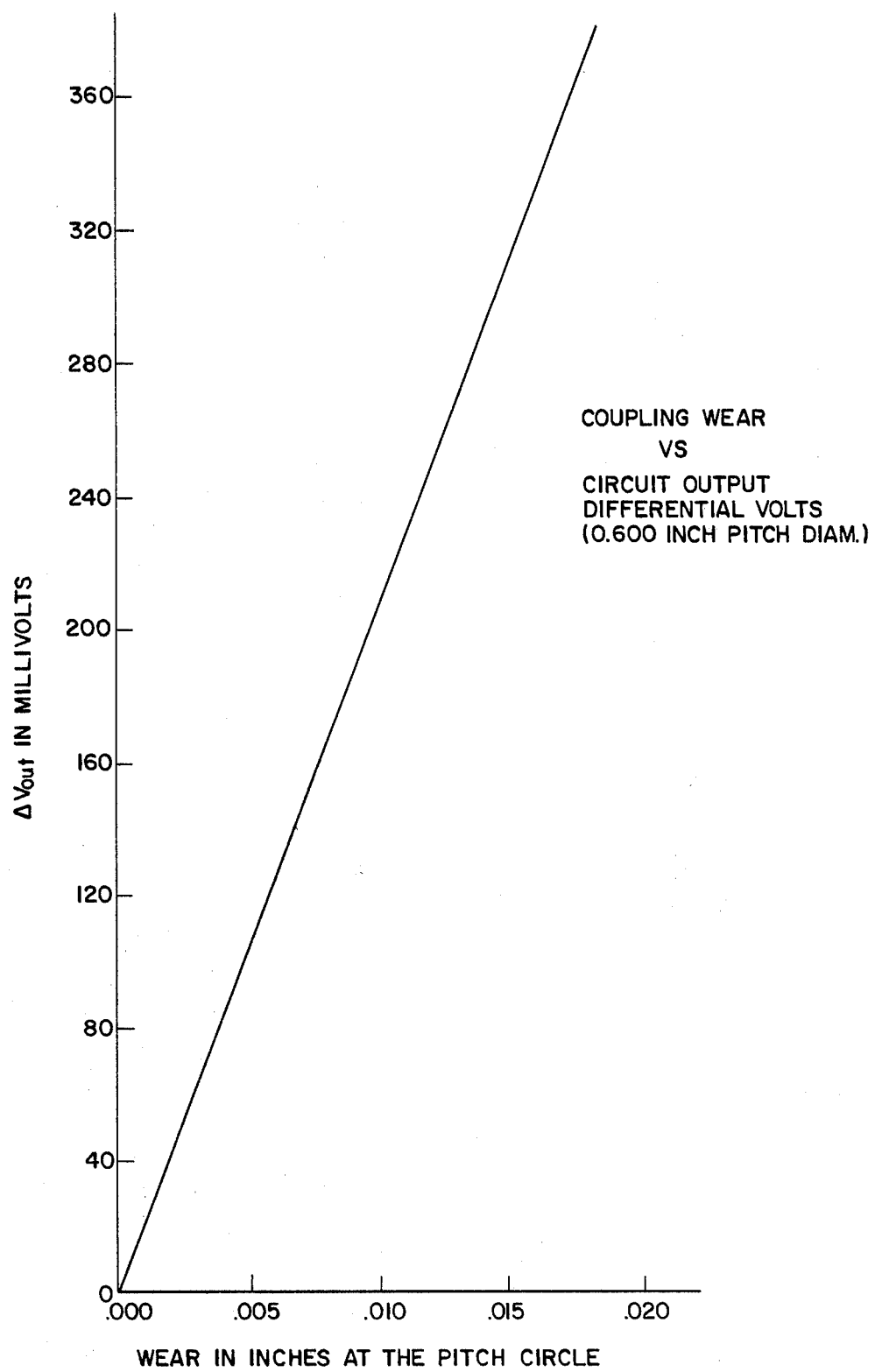
FIG. 7 is a graph showing the linear relationship between wear and change in output voltage developed by the system.

A typical embodiment of the circuit, as shown in FIG. 6 used the following components:
18,20—Electro P/N 3010 AN magnetic pick-up
34,36—IN4732A zener diode
38—AND gate portion of SN7408J 2-input quad gate 40—inverter portion of SN7406J hex inverter
48—2N328 PNP transistor
44—LM324J quad operational amplifier
62—resistor, 100K±10%, 150 W.
64—resistor, 20K±10%, ⅛ W.
66,68,70,80—resistor, 24K±10%, ⅛ W.
82—43K±10%, ⅛ W.
84—trim potentiometer, 50K
72,74,76—capacitor, tantalum, 33 μf FIG. 7 is a graph which shows the linear relationship between the wear in the spline and slot and the change in the output voltage from the operational amplifier. It can be seen that the function is quite linear.

Alternative methods of circuit arrangement will be readily apparent to circuit designers. The selection of the AND gate, inverter and pulse-modulated d.c. supply can be implemented using related or similar logic devices and slightly different transistor circuitry (e.g., NPN devices). Alternate components may be used depending on the stress levels and electrical demands of a given application. Pulse generators (such as proximity switches) other than magnetic pickups may be used to provide the input signals to the system. Opto-electronic pulse-generating devices may be used in the system. Circuit construction techniques are not critical to the proper functioning of this system so that breadboard, printed circuit or other assembly techniques can be used. The system will function properly with a wide variety of recording and display devices which are capable of accepting analog d.c. signal inputs.

The present invention offers the following new features and advantages over the old methods:

a. Machinery need not be stopped since the new method provides a reliable, dynamic, real-time measurement which is unaffected by machinery vibration or torsional oscillation.

b. The invention provides a highly accurate, linear measurement technique as evidenced by the sample data (FIG. 7).

c. Displacement measurements may be easily and directly recorded or displayed by a wide variety of readily available inexpensive instruments since the system output is an analog d.c. signal proportional to displacement.

d. The circuitry can be easily assembled from readily available and inexpensive components.

e. Calibration can be accomplished to fit the circuitry to any time-dependent displacement measurement (if necessary, additional magnets, or poles, can be added to increase the output signal from extremely slow displacement processes).

f. The analog d.c. signal makes automatic comparison with preselected parameter limits (automatic monitoring and alarm) easily achievable with readily available laboratory instruments.

g. The analog d.c. signal produced by the invention lends itself to expression directly in engineering units of displacement without cumbersome calculations to convert from the time domain to the displacement domain.

h. Machinery wear may be continuously monitored employing this invention. Thus, machinery so equipped may be kept in operation for the maximum service without risking catastrophic failure due to undetected wear.

i. Small or insidious displacement changes which would ordinarily be obscured by machinery vibration can be accurately detected by the invention.

Obviously, many modifications and variations of the present invention are possible in light of the above teachings. It is therefore to be understood that, within the scope of the appended claims, the invention may be practiced otherwise than as specifically described.

What is claimed is:

1. Apparatus for measuring the linear or angular displacement between two, coupled, movable members comprising:
   first reference means attached to a first member for marking a reference location thereon;
   second reference means attached to a second member for marking a reference location thereon;
   first pulse means for deriving a first pulse from the first reference means;
   second pulse means for deriving a second pulse from the second reference means;
   first means for converting said first pulse to a first logic level pulse;
   second means for converting said second pulse to a second logic level pulse;
   AND means for combining said first and second pulses to produce an AND pulse having a time duration equal to the overlap time of said first and second pulses, any change in the time duration of an AND pulse and prior AND pulses being proportional to a displacement between said coupled members; and
   means for utilizing said AND pulse.

2. A method as in claim 1, wherein:
   one of said pair of electrical pulses has a time duration of $t_d$, and the other has a time duration of $t_b + t_c$, $t_b + t_c$ being equal to $t_d$;
   and wherein $t_b$ may include a time, $t_w$, resulting from coupling wear;
   and wherein $t_d > 2t_w$ or $t_b > t_w$ or $t_c > t_w$.

3. The device of claim 1 wherein said means for converting said pulses to logic level pulses are zener diodes.

4. The device of claim 3 which further comprises:
   means for modifying said AND pulse to produce a pulse having a magnitude proportional to $t_b/(t_r - t_b)$ wherein $t_b$ is equal to the overlap time between said first and second pulses and $t_r$ is the period between the starting points of any two successive AND pulses;
   means for buffering said modified pulse to eliminate variations caused by torsional oscillations;
   means for amplifying said buffered pulse; and
   means for utilizing said amplified pulse.

5. The device of claim 4 wherein said buffering means comprises a pulse-width-modulated switching and filter means.

6. Apparatus for measuring the angular displacement between two rotating shafts comprising:
   first reference means attached to a first shaft marking a reference location thereon;
   second reference means attached to a second shaft marking a reference location thereon;
   first pulse means for deriving a first pulse from said first reference means;
   second pulse means for deriving a second pulse from said second reference means;
   first means for converting said first pulse to a first logic level pulse,
   second means for converting said second pulse to a second logic level pulse;
   AND means for combining said first and second pulses to produce an AND pulse having a time duration equal to the overlap time of said first and second pulses, any change in the time duration of an AND pulse and prior AND pulses being proportional to a displacement between said coupled means; and means for utilizing said AND pulse.

7. The device of claim 6 wherein said means for converting said pulses to logic level pulses are zener diodes.

8. The device of claim 7 which further comprises:
means for modifying said AND pulse to produce a pulse having a magnitude proportional to $t_b/(t_r-t_b)$ wherein $t_b$ is equal to the overlap time between said first and second pulses and $t_r$ is the period between the starting points of any two successive AND pulses;
means for buffering said modified pulses to eliminate variations caused by torsional oscillations;
means for amplifying said buffered pulse; and
means for utilizing said AND amplified pulse.

9. The device of claim 8 wherein said buffering means comprises a pulse-width-modulated switching and filter means.

* * * * *